March 15, 1960
S. H. LIEBSON
2,928,993
FLAT PICTURE SCREEN AND METHODS AND MEANS
FOR OPERATING THE SAME
Filed March 21, 1955
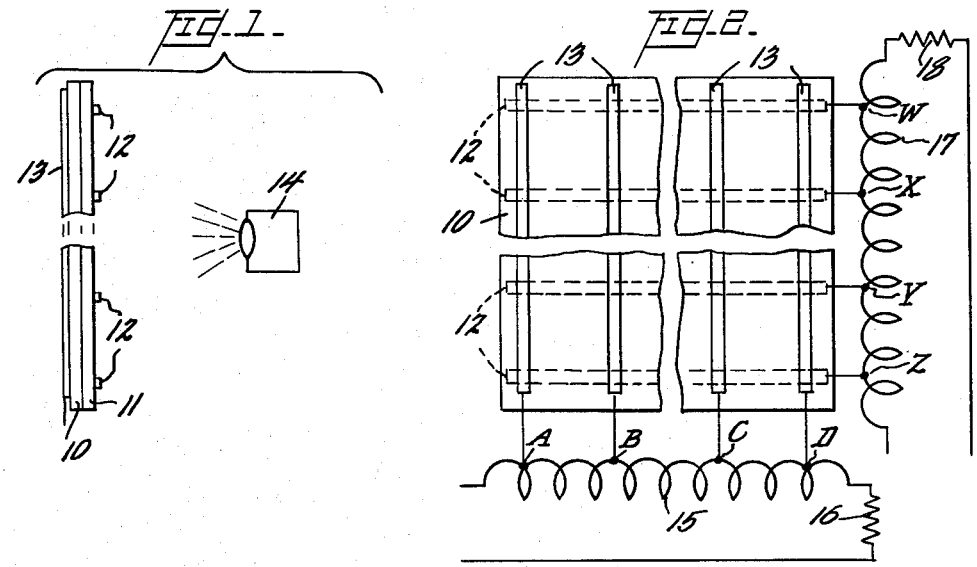
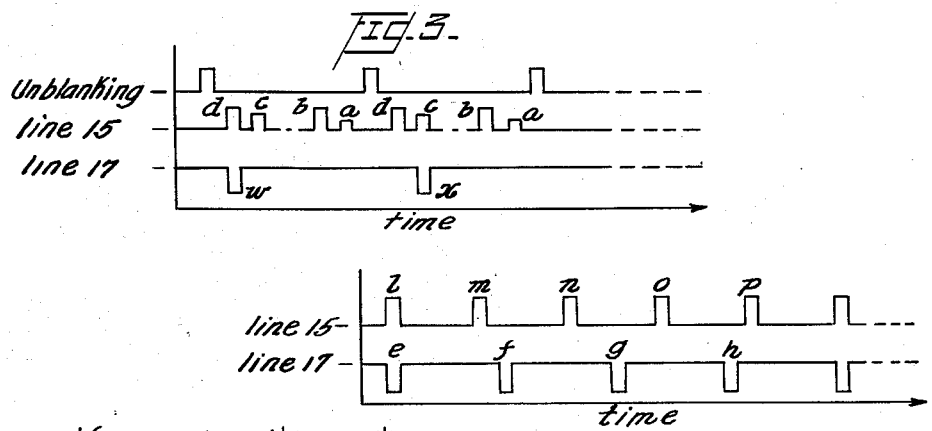
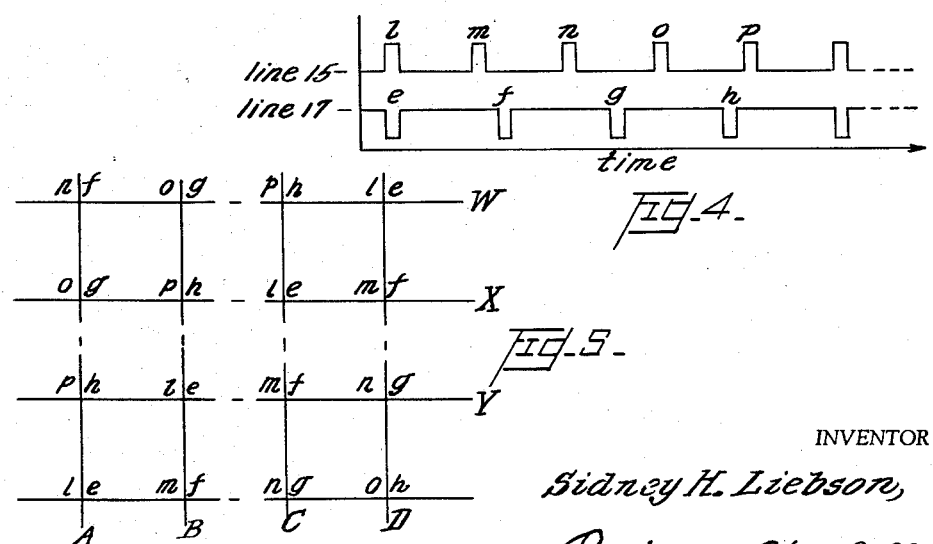
INVENTOR
Sidney H. Liebson,
BY Paris and Haskell
ATTORNEYS

United States Patent Office 2,928,993
Patented Mar. 15, 1960

2,928,993

FLAT PICTURE SCREEN AND METHODS AND MEANS FOR OPERATING THE SAME

Sidney H. Liebson, White Plains, N.Y., assignor to The Rauland Corporation, a corporation of Illinois Application March 21, 1955, Serial No. 495,748

25 Claims. (Cl. 315—169)

The present invention relates to the art of facsimile, picture, or graphic communications, and more particularly to screen and associated system for effecting a facsimile, pictorial, graphic, or other patterned visual presentation of electrically carried intelligence.

In the above-indicated art of electrical communications, as is exemplified by television, it has been a prevailing practice to utilize a cathode ray tube as the means for effecting a visual patterned presentation of intelligence carrying electrical signals. However, in view of the inherent shape and consequent bulk of cathode ray tubes, it is a desideratum of the industry to replace these tubes with an electrically responsive picture tube or screen having a substantially flat dimension. The present invention is accordingly directed to this end, and provides: first, a flat picture screen suitable for facsimile, pictorial, graphic, or other patterned visual presentation of electrical intelligence; and second, a simple and efficient system for controlling the operation of the screen. Although the present invention has as one of its aspects the provision of an improved picture screen, it is to be understood that the control system aspect of the invention is not limited to the instant screen, but may be used for the control of other picture screens or tubes having certain characteristics in common with the present screen, as will become apparent from a further consideration of the present invention.

Considering the picture screen of the present invention, it is a flat unit utilizing and combining the two electro-physical principles of photoconductivity and electroluminescence. Basically, the present screen comprises two superimposed layers or films, one of photoconductive material and the other of electroluminescent material, and two grids of electrical conductors are provided, one grid carried on or embedded in each of the aforestated layers. To utilize the screen as a visual facsimile reproducer of electrically carried intelligence, it should be operationally delineated into a plurality of points arranged in a determined geometric pattern. For this purpose, one of the aforementioned grids is layed as a plurality of essentially parallel conductors extending across its respective layer in a given direction (e.g. horizontally) while the other of said grids is layed as a similar group of essentially parallel conductors extending across the other of said layers at an angle, preferably 90 degrees, to the first grid (e.g. vertically). Thus, the projected intersections of the conductors of the two grids define a prescribed regular geometric pattern of points. With this arrangement, if appropriate voltage signals are applied to certain conductors of both grids coincident with illumination of the photoconductive layer by an appropriate light source, the electroluminescent layer will luminesce at those points where intersecting conductors of the two grids are carrying the applied voltage signals.

For convenience, a picture screen or tube of the general type here described, that is one relying upon a plurality of intersecting electrical conductor grids, or the functional equivalent, for prescribing a geometric pattern of points, shall be referred to in the present specification and appended claims as a grid screen or grid type screen. It is not intended, however, that this term as used herein shall be limited to the specific grid screen above described, for it is intended by this term to embrace screens employing other principles of obtaining a visual response from the intersecting grids, as for example is shown in U.S. Patent 1,779,748 to Alexander McL. Nicolson, or in U.S. Patent 1,754,491 to George Wald. It is also intended by this term to embrace the functional equivalents of the above indicated grid screens, such as those comprising a plurality of individual lamps and exemplified by the U.S. Patent 2,021,010 to Charles F. Jenkins.

In order to place a grid type screen into effectual operation as a means for presenting electrically encoded intelligence in intelligible facsimile, pictorial, graphic, or other patterned visual form, it is necessary to provide an appropriate scanning, and in some instances a blanking or unblanking system. With grid type screens, the control of their operation is dependent upon the application of electrical signals to the plurality of conductors of each of the two grids in predetermined appropriate sequence and time relationship. Depending upon the selected nature of operation of the grid screen and the inherent characteristics of the particular screen, grid excitation may be effected simply as a regular recurrent screen scanning pattern, relying upon a third facet or factor of the grid screen unit for luminescence or luminance control of each of the points scanned, as for example a modulated light source in the case of the grid screen of the present invention particularly described above, or for example an electrical control electrode interposed between the two grids in the case of a gaseous discharge type of grid screen. Alternatively, one may appropriately apply the luminance intelligence to one grid while scanning with the second grid of the screen, and utilize the above suggested third facet of the grid screen system as an unblanking means operating in appropriate synchronism with the grid excitations. In any event, regardless of the scheme employed, one of the major problems in effectively utilizing grid type screens for the present purposes is the requirement of applying signals to the large number of conductors of each grid in a predetermined time pattern. Heretofore it has been the prevalent practice to utilize a switching means, either mechanical or electronic, for applying the signals to the grid conductors in predetermined sequence. In accordance with present day television standards, it becomes necessary to switch with relation to 1050 leads. Such an arrangement is patently cumbersome and grossly complex from the manufacturing standpoint. In accordance with the present invention, however, the improved grid type screen operating system eliminates or reduces, as desired, the need for switching and in place thereof utilizes a delay line in conjunction with one or both grids. By connecting each of the conductors of a grid to spaced intervals along a delay line, that grid may then be scanned by the application of a pulse to one end of the delay line, this pulse energizing each conductor of the grid in succession as it traverses the delay line. The use of a delay line control of the grids is also highly advantageous where it is desired to use the grids as the medium of luminance or video intelligence instead of merely scanning. For example, a series of luminance intelligence pulses may be fed along the delay line of one grid until a complete line of intelligence is at one instant applied in sequence to each of the conductors of that grid. By appropriate synchronization, a scanning pulse may be fed into the delay line of the other grid so as to be at a selected conductor at the instant that the complete line of intelligence is applied to the first grid. Also at said instant, the grid type screen may be unblanked through the medium of the third aspect of the screen's control system, to thereby visually present one complete line of video intelligence. By appropriate time synchronization, successive lines of video intelligence may thus be visually presented to complete a frame of the facsimile, pictorial, graphic, or other patterned visual presentation. Likewise, appropriately synchronized pulses may be applied to each of the two delay lines to effect a predetermined scanning pattern over the plurality of points of intersection of the two grids, while luminance intelligence is applied in synchronized relation thereto to the third control aspect of the grid type screen. In this manner individual points of the screen are illuminated in sequence in accordance with the patterned electrical intelligence transmitted to the screen and its control system.

Accordingly, it is one object of the present invention to provide a novel grid type screen.

Another object of the present invention is to provide a novel grid type screen suitable for use as a television receiver screen, and generally for the visual presentation of facsimile, pictorial, graphic, or other patterned intelligence transmitted in the form of encoded electrical signals.

Another object of the present invention is to provide a grid type screen as above indicated utilizing the combined principles of photoconductivity and electroluminescence.

Another object of the present invention is to provide a control system for grid type screens.

Another object of the present invention is to provide for scanning or selectively energizing the conductors of the grids of a grid type screen.

Another object of the present invention is to provide for scanning or selectively energizing the conductors of a grid of a grid type screen by applying an individual signal sequentially to a plurality of said conductors.

Another object of the present invention is to provide for the simultaneous application of a plurality of signals to a plurality of conductors of a grid of a grid type screen with different signals applied to the different conductors.

Another object of the present invention is to provide for the simultaneous application of a plurality of time displaced signals to a plurality of conductors of a grid of a grip type screen with different signals applied to different conductors.

Another object of the present invention is to provide for scanning or selectively energizing the conductors of a grid of a grid type screen by applying a plurality of signals sequentially to the conductors.

Another object of the present invention is to provide for scanning or selectively energizing the conductors of a grid of a grid type screen by applying a plurality of signals sequentially to one conductor, then sequentially to each of a plurality of subsequent conductors in sequence.

Another object of the present invention is to provide a system for effecting a facsimile, pictorial, graphic, or other patterned visual presentation of electrically carried intelligence.

A still further object of the present invention is to provide a system as above stated employing a grid type screen of combined photoconductive and electroluminescence characteristics, a delay line for controlling the energization of conductors of a grid of said screen, and a source of illumination as an additional aspect of screen luminance control.

Other objects and advantages of the present invention will become apparent from a consideration of the following detailed description thereof, presented by way of example to facilitate a clear understanding of the invention by those skilled in the art. The following detailed description is had in conjunction with the accompanying drawings wherein:

Fig. 1 is an end view of a grid screen in accordance with the present invention;

Fig. 2 is a front face view of the screen of Fig. 1 with means for controlling grid conductor energization;

Fig. 3 is a time chart of one mode of operational control of the grid screen of Fig. 2;

Fig. 4 is a time chart of another mode of operational control of the grid screen of Fig. 2; and Fig. 5 is a diagrammatic presentation of the scanning sequence effected by a scheme embraced by a mode of control of Fig. 4.

Referring to the drawings, the grid type screen per se of the present invention is shown as comprising two superimposed layers or films 10 and 11. The front layer or film 10 is formed of an electroluminescent material such as, for example, of the zinc sulfide type, or of other appropriate materials as defined in U.S. Letters Patent 2,698,915 to William W. Piper; while the rear layer or film 11 is formed of a photoconductive material such as, for example, of the cadmium sulfide type. The adjacent surfaces of layers 10 and 11 are united to afford electrical contact therebetween. Affixed to or imbedded in the photoconductive film is the grid of parallel conductors 12 extending in one direction, e.g., horizontally, and a similar grid of parallel conductors 13 is affixed to or imbedded in film 10, the latter conductors extending in a second direction, e.g., vertically. Associated with the screen 10, 11 is a light source 14, which may be located in any convenient position where it is capable of illuminating the photoconductive layer of the screen. Various optical arrangements for the light source 14 will be apparent to those skilled in the art, and any such arrangement is suitable for the purposes of the present invention, so long as it accomplishes the end of illuminating the film 11 of the screen.

Having thus described the basic structure of the grid type screen of the present invention there follows a description of its basic manner of operation. For the purpose of explanation, if the grid 12 were applied directly to the electroluminescent layer 10 and the film 11 were absent, the operation of the screen would be as described in the above cited patent to William W. Piper. That is, upon the application of appropriate voltage signals to the conductors of the two grids, the electroluminescent layer 10 would be caused to luminesce at the intersecting points of the two grids where said voltage signals are present. In the instant screen, the film 11 of photoconductive material interposed between the grid 12 and layer 10 operates as a variable resistance, and when the voltage signals are applied to the grids as above, at the points of intersection of the grids the layer 10 is not caused to luminesce unless the resistance of the film 11 is reduced sufficiently to afford the necessary voltage difference across the layer 10. For this purpose, light source 14 is provided to reduce the resistance of film 11 and render the same conductive as desired. Thus, upon the coincident conditions of appropriate voltage signals upon grids 12 and 13 and illumination of film 11, as from light source 14, the layer 10 is caused to luminesce at the points of intersection of the grids across which the voltage signals are applied. It can thus be generally appreciated that with the present grid type screen and its associated light source, a luminescent pattern may be selectively described on the screen by the successive applications of appropriate voltage signals to appropriate pairs of conductors of the two grids synchronized with illumination of film 11 by light source 14. Also it will be appreciated that the intensity of luminescence may be controlled either by control of the magnitude of voltage signals applied to the grids, or by control of the intensity of illumination of film 11 afforded by light source 14, thus controlling the amount of grid signal dissipated or lost across the film 11.

In order to effect a scanning of the intersecting grid points or a selective energization of said points, as is necessary for presenting a facsimile or other patterned reproduction on the present screen, or other grid type screens, it has heretofore been the practice to utilize switching, by either mechanical or electronic means, to the several conductors of the grids. In accordance with the present invention, however, selective energization of said points, or a scanning of the screen is effected by means of delay lines. In Fig. 2 there is shown a delay line system cooperating with the above-described grid screen. Each of the conductors 13 is electrically connected at spaced intervals to delay line 15, which is terminated in its characteristic impedance 16 to prevent reflections back through the line. Similarly, each of the conductors 12 of the other grid is electrically connected to a delay line 17 at spaced intervals therealong. Line 17 also has a terminal characteristic impedance 18. Since it is preferred that the several conductors of each grid be regularly spaced across the screen, it is also preferred that the spacing of the connections thereof along the respective delay lines be equally spaced, representative of equal time intervals.

In accordance with one preferred mode of operation of the grid screen and operating system hereinabove described, one complete horizontal line of intelligence pulses is fed into line 15 during each cycle, also during each cycle a pulse is fed into the vertical line 17. At a fixed reference point in each cycle—that is, at the instant when a complete horizontal line of intelligence is properly positioned on 15—a pulse or other trigger is used to momentarily energize lamp 14 and thus illuminate the photoconductive film 11. The illumination of lamp 14 thus functions to unblank the screen, and the horizontal line of intelligence carried by line 15 is applied across the screen at the vertical position determined by the location of the vertical pulse on line 17.

For a further explanation of this mode of operation, reference is had to the time chart of Fig. 3 depicting two cycles of operation. As shown, immediately following an unblanking pulse a new cycle commences. Fed into the horizontal delay line 15 is the sequence of pulses $d$, $c$, $b$, and $a$, in that sequence, and substantially coincident with pulse $d$ pulse $w$ is fed into vertical delay line 17. As the several pulses $d$, $c$, $b$, $a$, and $w$ travel down the delay lines, the screen is blanked because light source 14 is extinguished. However, at the end of the cycle, when the unblanking pulse appears, pulses $a$, $b$, $c$, and $d$ are on the delay line 15 coincident with the connections A, B, C and D of grid conductors 13, the pulse $w$ is coincident on line 17 with the position of connection W to the corresponding conductor of grid 12. Thus, the intelligence carried on line 15 is presented across the screen in the vertical position of W. Following this unblanking pulse, the first set of pulses $d$, $c$, $b$, and $a$ moves off line 15 as a second set of such pulses moves onto the line. Similarly pulse $w$ moves off line 17 as a second vertical pulse $x$ moves onto the line. In this second cycle, however, the time of application of pulse $x$ to line 17 is delayed one unit in time, i.e., the time delay represented between two adjacent connections to vertical delay line 17, or the time required for a pulse to travel from Z to Y, or X to W on line 17. Therefore, on the second cycle represented in Fig. 3, when the intelligence represented by pulses $d$, $c$, $b$, and $a$ is properly located on line 15 and the unblanking pulse is applied to light source 14, pulse $x$ is located at point X on line 17, thus causing the intelligence on line 15 to be presented across the screen at that vertical level on the screen corresponding to point X. The operation of the system continues in this fashion with the vertical pulses applied to line 17 being delayed one unit each cycle to cover the entire range of line 17 or provide a complete frame of intelligence, whereupon the set of cycles is repeated. In other words, the vertical scan pulses $w$, $x$, etc. are generated at a regular frequency somewhat less than the recurrence frequency of a line of intelligence $a$, $b$, $c$, and $d$, and this relationship holds for a complete frame or one complete presentation over the entire screen. At the inception of a second frame, if its first line is to follow immediately after the last line of the preceding frame, a new series of scan pulses $w$, $x$, etc. is started with the first pulse $w$ in time coincidence with the initial intelligence pulse.

As stated, with this mode of operation the video or luminance intelligence is introduced through line 15. Thus, the vertical line 17 may be designated the scanning means, and the light source 14 functions as an unblanking means to enable proper positioning of the pulses (intelligence and scan) on their respective delay lines for proper presentation on the screen. Since the amount of luminescence presented on the screen may be a function of voltage applied across the luminescent layer 10, the brilliance of illumination of each point of grid intersection may be controlled by the amplitudes of the signals $a$, $b$, $c$, and $d$, and for purpose of illustration these pulses are shown in Fig. 3 as having different amplitudes.

As an alternative scheme of operation, in the system illustrated in Figs. 1 and 2, the delay lines 15 and 17 may be utilized for scanning functions only, and the luminance or video intelligence may be translated from electrical signals through the light source 14. For this purpose regularly spaced pulses are introduced in the horizontal delay line 15, and these pulses should be spaced in time the interval required for a pulse to traverse line 15. These pulses are graphically represented as $l$, $m$, $n$, $o$ and $p$ in Fig. 4. A second set of regularly spaced pulses $e$, $f$, $g$, and $h$ are introduced in the vertical delay line 17 with a recurrence frequency somewhat less than pulses $l$, $m$, $n$, $o$, $p$. For a four by four line grid as illustrated, the frequency of pulses $e$, $f$, $g$, and $h$ should be ⅘ of that for pulses $l$, $m$, $n$, $o$, $p$, as shown. Line 17 should have a time value the same as that of 15 for a square screen, and the grid connections to the respective delay lines should be equally spaced with reference to time for equally spaced grid conductors. Horizontal pulse $l$ and vertical pulse $e$ are introduced simultaneously and therefore scan the screen diagonal of grid intersections noted in Fig. 5 as points $l$—$e$. The pulse $f$ is introduced to line 17 delayed one unit with respect to the application of pulse $m$ to line 15, therefore the line of grid intersections parallel to the diagonal and noted $m$—$f$ in Fig. 5 is scanned. When pulse $m$ passes off line 15, pulse $n$ enters at the time pulse $f$ is at the last step in its travel along line 17, thus scanning the point in Fig. 5 noted $n$—$f$. By a comparison of the pulses of Fig. 4 with the pulse couples noted at the grid intersections of Fig. 5, the remaining scanning sequence or pattern can be readily discerned. After pulse $p$ has passed off line 15, the scanning sequence is repeated starting again with coincident horizontal and vertical pulses.

Having thus provided a scanning system, by applying to the light source 14 the luminance intelligence properly keyed to the scan sequence, the layer 10 is caused to luminesce at those points of grid intersections where scanning sequence and illumination of light source 14 coincide. Also, since the intensity of light illumination derived from source 14 can control the intensity of luminescence of layer 10, the light source may be accordingly modulated in intensity by the electrical intelligence for effecting varying degrees of luminescence on the screen. Since for most applications of the present grid type screen and system the light source should be capable of a very high modulation frequency and reasonably accurate intensity control, it is suggested that a Kerr Cell system may be advantageously employed.

Modifications of the scan cycle derived from the frequency difference of pulse trains illustrated in Fig. 4 and described immediately above can be readily effected by appropriate choice of time values along the delay lines 15 and 17. For example, if the time delays embraced between points Z and Y, Y and X; and X and W are each made long as compared to the entire time delay embraced by line 15, and the time delay of line 15 is made equal to the time between successive pulses applied to line 15, the following mode of operation can be effected. For the present illustration we are concerned only with pulses $l$, $m$, $n$, and $o$ on line 15, and pulses $e$, $f$, $g$, and $h$, on line 17. Also, only one sequence of pulses $e$, $f$, $g$, and $h$ is introduced in line 17 per entire frame. The time delays between points Z and Y, Y and X, and X and W are each chosen to equal the time of one complete train of pulses $l$, $m$, $n$, and $o$. Upon the application of the stated pulses to their respective lines in the time relationship depicted in Fig. 4, the four points across the Z conductor 12 are activated in sequence, the first point by the pulse couple $l$—$e$, the second by the pulse couple $m$—$f$, the third by the pulse couple $n$—$g$, and the fourth by the pulse couple $o$—$h$. Immediately thereafter, with the entire sequence of pulses $e$, $f$, $g$, and $h$ stored in the time delay embraced between points Z and Y, upon the arrival of the second cycle pulse $l$, pulse $e$ appears at point Y, and the above sequence of action is repeated across the Y conductor 12. It thus becomes apparent that every point on the screen will be appropriately activated in sequence as operation continues throughout the frame. Upon the start of the second frame, a new sequence of pulses $e$, $f$, $g$, and $h$ is initiated. Of course, the widths of scanning pulses $e$, $f$, $g$, and $h$ are selected so that respective durations at points W, X, Y, and Z do not overlap the presence of any pulses $l$, $m$, $n$, or $o$ on two points A, B, C, and D during that pulse's travel along the line 15. With this mode of operation, the pulses on lines 15 and 17 could be used simply as scanning pulses, and a third aspect of the screen could be used for luminance or video control as previously indicated. However, such is not necessary, and the pulses $l$, $m$, $n$, and $o$ could be varied in amplitude to contain the luminance intelligence. With this latter mode of operation, it is apparent that one would not employ a control mask between one grid and the luminance producing medium since blanking or unblanking is not necessary, but in the case of an electroluminescent screen, the grid screen shown and described in the aforestated patent to William W. Piper is preferred.

A further modification of the scan sequence depicted in Figs. 4 and 5 is possible. By the present modification, the pulses $l$, $m$, $n$, $o$, and $p$ are applied to line 15 and pulses $e$, $f$, $g$, and $h$ are applied to line 17 to effect the scanning patterns aforedescribed. For the present purposes, the screen does not have the photoconductive layer 11, but the grids are both applied directly to the electroluminescent layer 10, as in the case of the William W. Piper patent aforementioned. The pulses applied to the grids through the delay lines are fixed at such voltage values that each pulse couple, $l$—$e$, $m$—$f$, $n$—$f$, etc., places the scanned points at a selected voltage level which is insufficient to cause the screen to luminesce. In appropriate synchronism with the scan, luminance intelligence signals are applied to all the conductors of one or both grids simultaneously, as desired, with voltage values which when added to the scan voltage will produce luminescence at those points where one obtains coincidence of scan signals and luminance intelligence. Varying degrees of brightness or the absence of luminescence may be had by accordingly varying the voltage of the intelligence signal. In order not to interfere with the scanning delay line or lines, the leads from the intelligence signal source to the several grid conductors should be provided with means to isolate said source with respect to the feeding of scan pulses therethrough which would tend to short circuit the delay line. This isolation may be readily accomplished, and one suggested means is the employment of diodes, i.e., one diode in each intelligence signal lead to each grid conductor. In this scheme the scan signals may be looked upon as providing a threshold voltage for the luminescent phosphor, but it is not intended to limit this concept to signals of strictly threshold magnitude. It is contemplated that the present scheme is particularly suited to and compatible with current commercial television. This scheme is obviously well adapted to other types of grid screens, as for example gaseous discharge luminance screens, where the general signals combining with the scan signals may be applied either to one grid, both grids, or to a third control electrode interposed between the two grids.

Having thus described one specific embodiment of the grid type screen and several specific embodiments of systems for controlling the operation thereof by use of delay lines in facsimile, pictorial, graphic, or other patterned visual presentation of electrically encoded intelligence, it is not intended to limit the scope of the invention thereto. Modifications of the means or schemes here presented will be apparent to those skilled in the art, and such as are within the spirit and scope of the appended claims are within the contemplation of the present invention. For example, although in its preferred embodiments the system is described as employing two delay lines, one on the screen horizontal axis and one on the screen vertical axis, it is apparent that the basic concept of this facet of the invention embraces the use of but one delay line, where it may be desired to use a switching system on the other axis of the screen. In such a system it is obvious from the foregoing that the single delay line may be used as the means for impressing intelligence on the screen, as in the first system embodiment above, or merely as a scanning means utilizing the light source as the medium for applying the intelligence, as in the second system embodiment above. The delay line teachings of the present invention are not restricted to the particular electroluminescent-photoconductive screen here described, but may be used with other grid type screens, as indicated previously. For example, the delay line teachings may be employed with a grid screen utilizing gaseous discharge as the luminance medium, wherein the grids are used as or connect with the anodes and cathodes in a gaseous discharge tube, and third control electrodes may be provided between these electrodes, if desired, for blanking or luminance control. Or, the delay line principles may be employed with a simple screen having merely a pair of grids with a luminance material responsive to signals on the grid interposed therebetween, without a third control aspect, depending upon the type of presentation scheme employed. Where it is desired to employ the delay line on only one axis of the screen, and utilize switching on the other axis, it is readily apparent that one may employ a grid type screen where no third control aspect is present, such as the photoconductive layer and light source. In such a case one may use the screen as described and defined in the above identified patent to William W. Piper, applying lines of intelligence through the switching medium of one axis and scanning each such line with the synchronized application of a pulse to the delay line of the other axis, to read out each bit of intelligence at its proper point on the line. Also, if desired, it is not essential that the photoconductive layer be used as a complete layer or film over the entire electroluminescent layer, for it may be applied in strips extending under the grid conductors 12, or be applied in isolated areas at the regions of grid conductor intersections, or the film may be etched after application of the conductors 12 to remove all or substantially all of the film in the areas between the conductors, for enhanced luminescent definition. It should be understood that the basic concept sought to be conveyed by the foregoing specific embodiment of grid type screen per se, is the utilization of a variable resistance mask, variable in response to a controllable condition, interposed between one grid and the electroluminescent phosphor layer as a control element for permitting, preventing, or varying the luminescence of the phosphor in response to energized intersecting grid conductors. It is not intended therefore to restrict the invention to the use of a photoconductive type of mask, for any material having variable impedance characteristics adapted to this purpose may be employed within the teachings of this invention. For example, a varistor, thermistor, thyrite or semiconductor material may be employed for certain purposes, in conjunction with appropriate means for controlling the impedance thereof.

Although the several specific descriptions had hereinabove have considered only four conductors for each grid, the extension of these teachings to any number of grid conductors will be readily apparent.

I claim:

1. A system for patterned visual presentation of electrically carried intelligence comprising a first layer of electroluminescent material, a second layer of photoconductive material superimposed thereon, a first grid of substantially parallel conductors carried by said first layer, a second grid of substantially parallel conductors carried by said second layer, said second layer being interposed between said first layer and said second grid, said two grids being relatively positioned to form a pattern of intersecting points between the conductors of one grid and the conductors of the other grid for the application of electrical signals across said electroluminescent material in the areas of said intersecting points, and a variable light source for controllably illuminating the photoconductive layer to a substantially uniform extent throughout the area of said pattern of intersecting points.

2. A system for patterned visual presentation of electrically carried intelligence comprising a first layer of electroluminescent material, a second layer of photoconductive material superimposed thereon, a first grid of substantially parallel conductors carried by said first layer, a second grid of substantially parallel conductors carried by said second layer, said second layer being interposed between said first layer and said second grid, said two grids being relatively positioned to form a pattern of intersecting points between the conductors of one grid and the conductors of the other grid for the application of electrical signals across said electroluminescent material in the areas of said intersecting points, an electrical delay line, means electrically connecting the conductors of one grid to said delay line at spaced points therealong corresponding to intervals of time delay, and a variable light source for controllably illuminating the photoconductive layer to a substantially uniform extent throughout the area of said pattern of intersecting points.

3. A system for patterned visual presentation of electrically carried intelligence comprising a first layer of electroluminescent material, a second layer of photoconductive material superimposed thereon, a first grid of substantially parallel conductors carried by said first layer, a second grid of substantially parallel conductors carried by said second layer, said second layer being interposed between said first layer and said second grid, said two grids being relatively positioned to form a pattern of intersecting points between the conductors of one grid and the conductors of the other grid for the application of electrical signals across said electroluminescent material in the areas of said intersecting points, two electrical delay lines, means for electrically connecting the conductors of one grid to one delay line at spaced points therealong, means for electrically connecting the conductors of the other grid to the other delay line at spaced points therealong, said spaced points corresponding to intervals of time delay, and a variable light source for controllably illuminating the photoconductive layer to a substantially uniform extent throughout the area of said pattern of intersecting points.

4. In a system for patterned visual presentation of electrically carried intelligence, the combination of a layer of electroluminescent material, a first grid of non-intersecting conductors carried by one surface of said layer, a second grid of non-intersecting conductors positioned adjacent the other surface of said layer, said two grids being relatively positioned to form a pattern of intersecting points between the conductors of one grid and the conductors of the other grid for the application of electrical signals across said electroluminescent material in the areas of said intersecting points, an electrical impedance material variable in impedance value by a controllable condition interposed between said second grid and said other surface of said layer in at least the regions of said intersecting points for electrically controlling in variable degrees the electrical impedance between said grids, and means for controllably varying the impedance value of said impedance material to a substantially uniform extent throughout the area of said pattern of intersecting points.

5. In a system for patterned visual presentation of electrically carried intelligence, the combination of a layer of electroluminescent material, a first grid of non-intersecting conductors carried by one surface of said layer, a second grid of non-intersecting conductors positioned adjacent the other surface of said layer, said two grids being relatively positioned to form a pattern of intersecting points between the conductors of one grid and the conductors of the other grid for the application of electrical signals across said electroluminescent material in the areas of said intersecting points, an electrical impedance material variable in impedance value by a controllable condition interposed between said second grid and said other surface of said layer for electrically controlling in variable degrees the electrical impedance between said grids, and means for controllably varying the impedance value of said impedance material to a substantially uniform extent throughout the area of said pattern of intersecting points.

6. In a system for patterned visual presentation of electrically carried intelligence, the combination of a layer of electroluminescent material, a first grid of non-intersecting conductors positioned adjacent one surface of said layer, a second grid of non-intersecting conductors positioned adjacent the other surface of said layer, said two grids being relatively positioned to form a pattern of intersecting points between the conductors of one grid and the conductors of the other grid for the application of electrical signals across said electroluminescent material in the areas of said intersecting points, means for applying electrical signals to said grids appropriate for luminescing said layer material, and blanking and unblanking means for controlling the response of said material to said luminance signals in accordance with a control condition.

7. In a system for patterned visual presentation of electrically carried intelligence, the combination of a first grid of non-intersecting conductors, a second grid of non-intersecting conductors spaced from said first grid, said two grids being relatively positioned to form a pattern of intersecting points between the conductors of one grid and the conductors of the other grid, a luminance material interposed between said grids responsive in the areas of said intersecting points to electrical signals carried by said grids, means for applying electrical signals to said grids, and blanking and unblanking means for controlling the response of said material to said signals in accordance with a control condition.

8. A system adapted for patterned visual presentation of electrically carried intelligence comprising a pair of spaced grids each having a plurality of non-intersecting conductors, the two grids being relatively positioned to form a pattern of intersecting points between the conductors of one grid and the conductors of the other grid, a material interposed between said grids responsive to electrical signals on said conductors to provide a visual indication in the areas of said intersecting points of the presence of said signals on grid conductors forming such intersecting points, additional means including means interposed between said grids in the areas of said intersecting points for variably modulating the response of said material to said signals in accordance with a control condition, a first electrical delay line, the conductors of one grid being electrically coupled thereto at spaced intervals therealong, and a second electrical delay line, the conductors of the other grid being electrically coupled thereto at spaced intervals therealong, said delay lines providing signal inputs for their respective grids.

9. A system adapted for patterned visual presentation of electrically carried intelligence comprising a pair of spaced grids each having a plurality of non-intersecting conductors, the two grids being relatively positioned to form a pattern of intersecting points between the conductors of one grid and the conductors of the other grid, a material interposed between said grids responsive to electrical signals on said conductors to provide a visual indication in the areas of said intersecting points of the presence of said signals on grid conductors forming such intersecting points, means for variably modulating the response of said material to said signals in accordance with a control condition, a first electrical delay line, the conductors of one grid being electrically coupled thereto at spaced intervals therealong, and a second electrical delay line, the conductors of the other grid being electrically coupled thereto at spaced intervals therealong, said delay lines providing signal inputs for their respective grids.

10. A system adapted for patterned visual presentation of electrically carried intelligence comprising a pair of spaced grids each having a plurality of non-intersecting conductors, the two grids being relatively positioned to form a pattern of intersecting points between the conductors of one grid and the conductors of the other grid, a material interposed between said grids responsive to electrical signals on said conductors to provide a visual indication in the areas of said intersecting points of the presence of said signals on grid conductors forming such intersecting points, means for variably modulating the response of said material to said signals in accordance with a control condition, and an electrical delay line, the conductors of one grid being electrically coupled thereto at spaced intervals therealong, said delay line providing a signal input for said last mentioned grid.

11. A method of applying intelligence to a double grid type screen having a blanking and unblanking means for controlling the screen response to grid signals comprising for each frame: applying successive lines of intelligence signals to the conductors of one grid with a different portion of each line being applied to each conductor simultaneously at regularly recurrent intervals, applying to the conductors of the second grid, in sequence, regularly recurrent signals designed to enable read out of said intelligence and having a recurrence frequency different from that of the lines of intelligence signals recurrence frequency, and unblanking said screen at regular intervals in coincidence with the presence of lines of intelligence on said first-mentioned grid.

12. A method of applying intelligence to a double grid type screen having a control means for modulating the screen response to grid signals comprising sequentially applying signals to the conductors of one grid at a selected signal repetition frequency, sequentially applying signals to the conductors of the other grid at a selected signal repetition frequency different from that of the first stated frequency, and applying intelligence signals to said modulating control means in keyed relation to the screen scan pattern effected by said two grid signals.

13. A method of applying intelligence to a double grid type screen comprising applying intelligence signals sequentially to each of the conductors of one grid, applying a train of signals sequentially to the conductors of the other grid, the complete train of signals being applied to each conductor of the last-mentioned grid before any portion of the train is applied to the subsequent conductor thereof.

14. A method of applying intelligence to a grid type screen comprising applying a sequence of lines of intelligence signals to the conductors of one grid with a different portion of each line being applied to each said conductor simultaneously at regularly recurrent intervals, and applying a signal, designed to enable a read out of said intelligence, to individual conductors of a second grid in sequence, said sequence of application of read out signals to said second grid conductors being in time coincidence with said sequence of application of lines of intelligence to said first grid, whereby a sequence of lines of intelligence may be read out a line at a time.

15. In a system for patterned visual presentation of electrically carried intelligence, the combination of a grid of non-intersecting conductors, at least one additional conductor spaced from said grid and positioned to form a pattern of intersecting points between the conductors of said grid and said additional conductor, a luminance material interposed between said grid and additional conductor responsive in the areas of said intersecting points to electrical signals carried by said grid and additional conductor, means for applying electrical signals to said grid and additional conductor, and blanking and unblanking means for controlling the response of said material to said signals in accordance with a control condition.

16. In a system as set forth in claim 15, said luminance material being a layer of electroluminescent material.

17. In a system for patterned visual presentation of electrically carried intelligence, a first grid of non-intersecting conductors, a second grid of non-intersecting conductors spaced from said first grid, said two grids being relatively positioned to form a pattern of intersecting points between the conductors of one grid and the conductors of the other grid, a luminance material interposed between said grids responsive in the areas of said intersecting points to electrical signals carried by said grids, mean for applying electrical signals to said grids, and means for variably controlling the response of said luminance material to said signals over the area of said pattern of intersecting points in accordance with a control parameter.

18. In a system as set forth in claim 17, said luminance material being a layer of electroluminescent material.

19. A method of applying intelligence to an electroluminescent screen, comprising receiving in time sequence a plurality of electrical signals representative of bits of intelligence storing said signals, and applying them simultaneously to said screen in a spatially disposed pattern to display at once the stored intelligence information.

20. In a system for patterned visual presentation of electrically carried intelligence, the combination of a grid of non-intersecting conductors, at least one additional conductor spaced from said grid and positioned to form a pattern of intersecting points between the conductors of said grid and said additional conductor, a luminance material interposed between said grid and additional conductor responsive in the areas of said intersecting points to electrical signals carried by said grid and additional conductor, means for applying electrical signals to said grid and additional conductor, and means for variably controlling the response of said luminance material to said signals over the area of said pattern of intersecting points in accordance with a control parameter.

21. In a system as set forth in claim 20, said luminance material being a layer of electroluminescent material.

22. In a system for patterned visual presentation of intelligence, the combination of a set of non-intersecting conductors, an additional conductor spaced from said set and providing a pattern of areas where said additional conductor and the conductors of said set are juxtaposed, a luminance material, interposed between the conductors of said set and said additional conductor in said areas, responsive to electrical signals carried by said set of conductors and said additional conductor, means for applying electrical signals to said set of conductors and said additional conductor, and means for variably controlling the response of said luminance material to the signals carried by said set of conductors and additional conductor in accorrdance with a control parameter.

23. In a system as set forth in claim 22, said luminance material being an electroluminescent material.

24. In a system as set forth in claim 23, the last-mentioned means including a photoconductive material interposed between said set of conductors and said additional conductor.

25. In a system as set forth in claim 21, the last-mentioned means including a photoconductive material interposed between said grid and said additional conductor.

References Cited in the file of this patent

UNITED STATES PATENTS

| | | |
|---|---|---|
| 1,754,491 | Wald | Apr. 15, 1930 |
| 1,779,748 | Nicolson | Oct. 28, 1930 |
| 2,645,721 | Williams | July 14, 1953 |
| 2,670,402 | Marks | Feb. 23, 1954 |
| 2,698,915 | Piper | Jan. 4, 1955 |
| 2,728,815 | Kalfaian | Dec. 27, 1955 |
| 2,773,992 | Ullery | Dec. 11, 1956 |
| 2,818,531 | Peek | Dec. 31, 1957 |

FOREIGN PATENTS

| | | |
|---|---|---|
| 157,101 | Australia | June 16, 1954 |

OTHER REFERENCES

Review of Scientific Instruments, vol. 24, June 1953, pages 471 and 472.